United States Patent [19]

Vian

[11] 3,938,587
[45] Feb. 17, 1976

[54] COOLER FASTENING SYSTEM

[75] Inventor: David R. Vian, Rialto, Calif.

[73] Assignee: Hayden Trans-Cooler, Inc., Corona, Calif.

[22] Filed: Jan. 6, 1975

[21] Appl. No.: 538,574

[52] U.S. Cl. .................................. 165/76; 85/7
[51] Int. Cl.² .................................. F28F 7/00
[58] Field of Search ................. 85/7; 165/51, 76

[56] References Cited
UNITED STATES PATENTS

| 3,297,080 | 1/1967 | Williams et al. | 165/77 |
| 3,483,788 | 12/1969 | Keeler | 85/7 |
| 3,661,048 | 5/1972 | Judd | 85/7 |
| 3,757,853 | 9/1973 | Damen | 165/76 |

Primary Examiner—Charles J. Myhre
Assistant Examiner—Theophil W. Streule, Jr.
Attorney, Agent, or Firm—Albert L. Gabriel

[57] ABSTRACT

A tension fastener for quick-mounting an oil cooler in stacked relationship on one side of the radiator or condenser in an automotive or other engine system.

19 Claims, 14 Drawing Figures

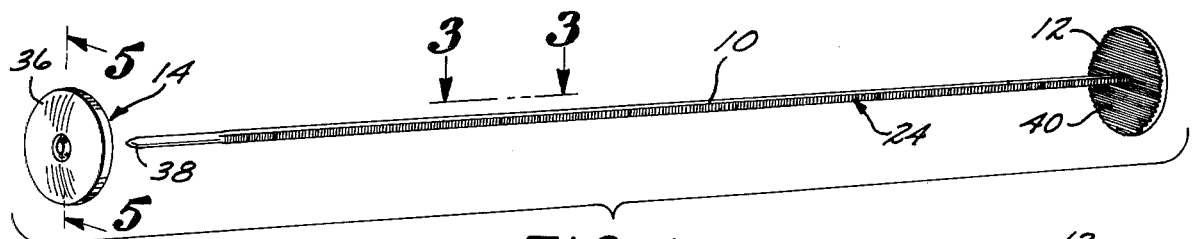
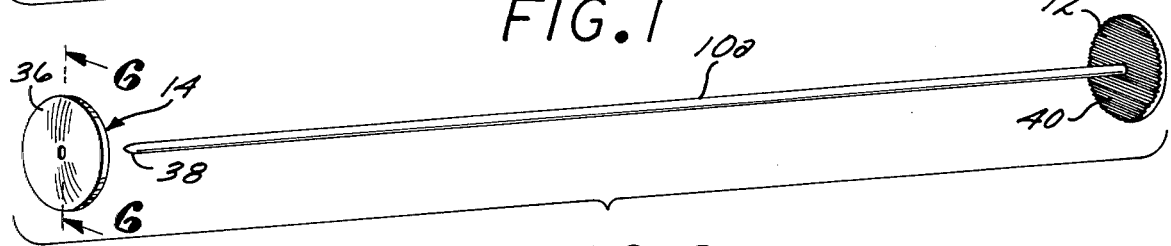
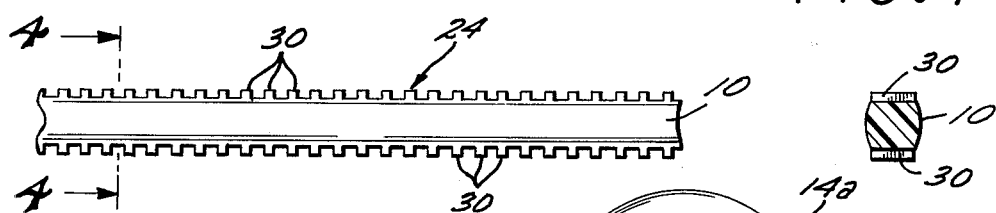
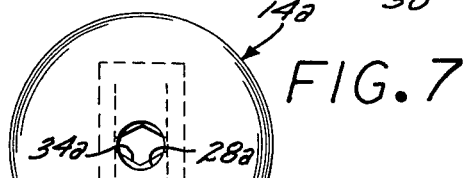
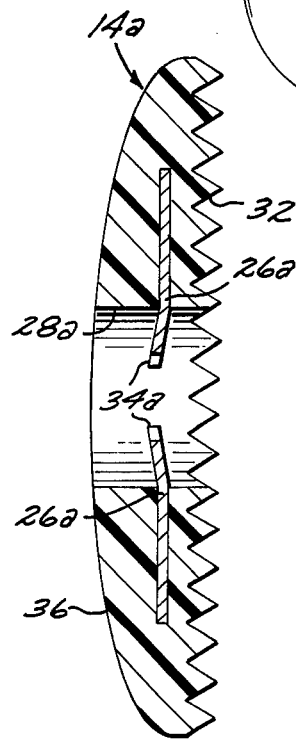
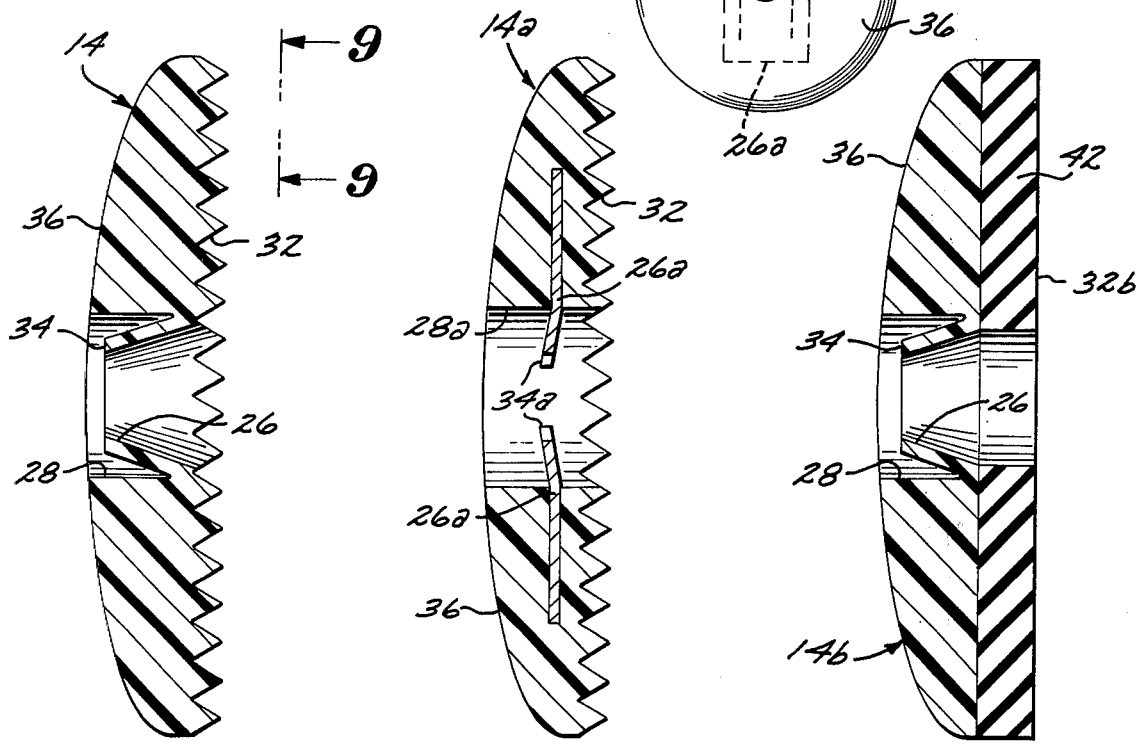
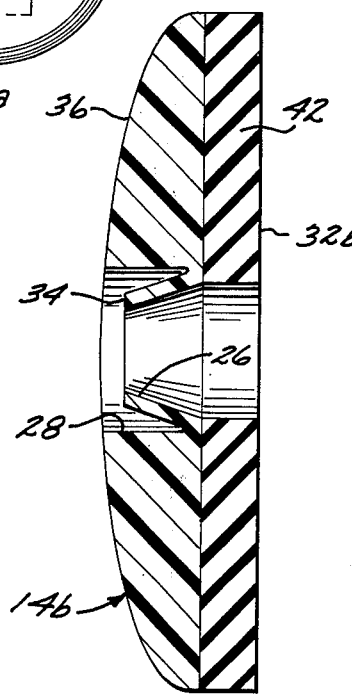

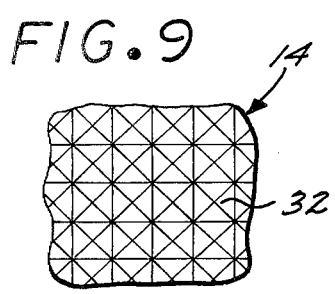
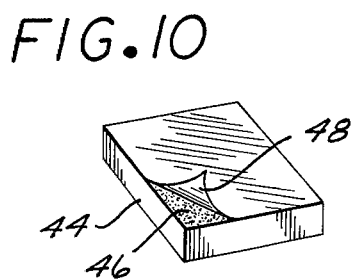
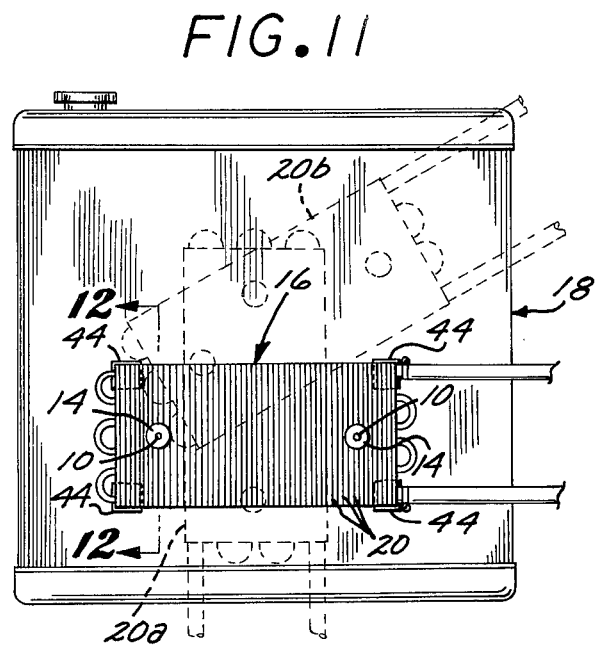
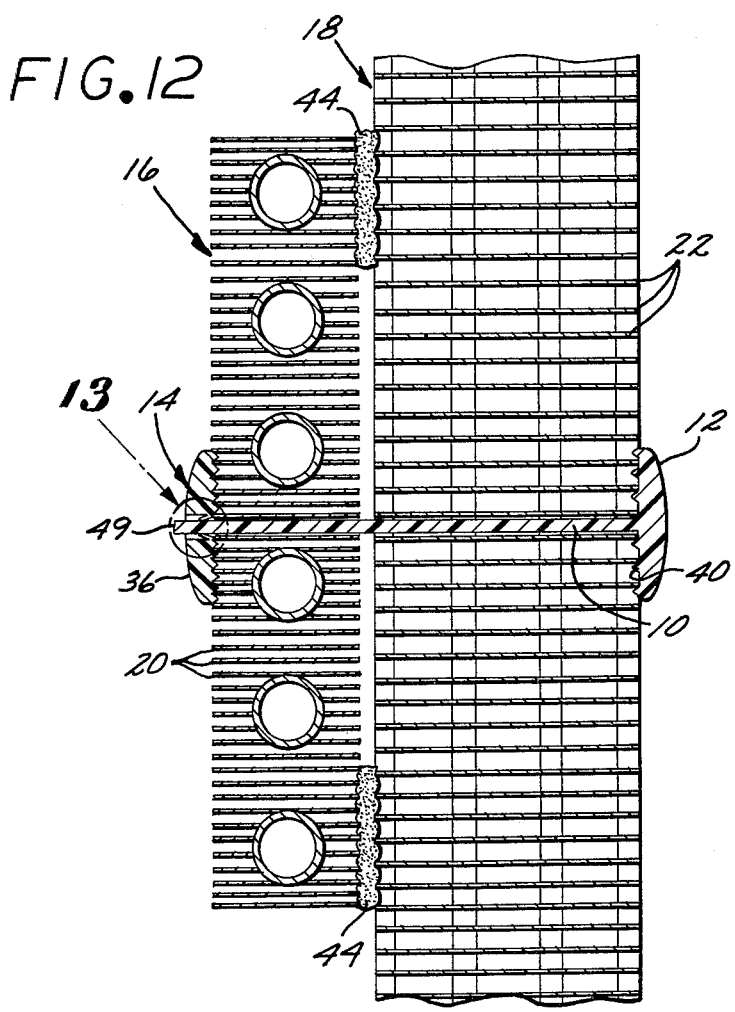
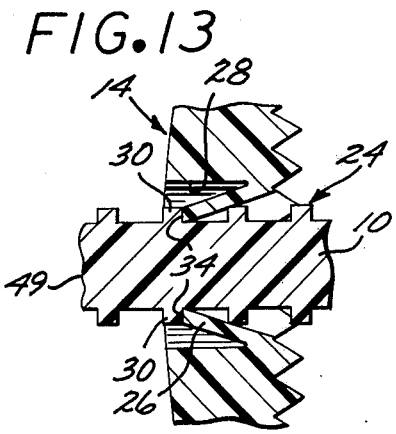
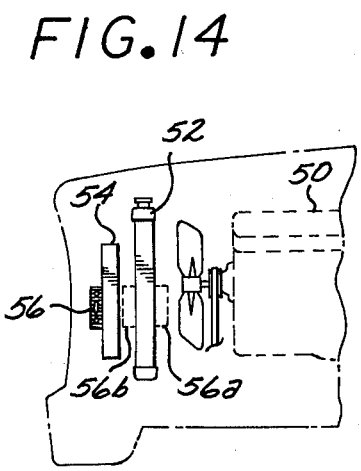

COOLER FASTENING SYSTEM

BACKGROUND OF THE INVENTION

1. Field of the Invention

The invention is in the field of oil coolers for cooling transmission oil, engine oil, power steering oil or the like in an automotive or other engine system.

2. Description of the Prior Art

Heat exchangers are employed extensively for supplemental cooling of oil employed in connection with engine systems, including but not limited to automatic transmission fluid, power steering fluid, and engine lubricating oil. In automotive internal combustion systems, such oil coolers are employed in addition to the conventional engine coolant radiators and air conditioner condensers. A widely used heat exchange system employing such an oil cooler in an automotive internal combustion engine system is disclosed in U.S. Pat. No. 3,315,464, issued Apr. 25, 1967 to Perez M. Hayden.

Because of space limitations and accessibility to good air flow, it is desirable to mount such an oil cooler in generally parallel, stacked relationship to the engine coolant radiator or air conditioner condenser, and this is true both for original equipment or "O.E.M." installations and for field or "after market" installations.

Traditionally, such oil coolers were bracket-mounted, which was undesirably expensive and time-consuming, requiring that the oil coolers be supplied with clamps, straps, nuts and bolts, washers, metal screws, and the like, and this type of mounting required extensive installation time.

Since it is desirable both because of the availability of suitable space in an otherwise generally crowded environment and because of the good flow of cooling air, to mount such an oil cooler in association with either the engine coolant radiator or the air conditioner condenser, it would also be desirable to mount the oil cooler directly on the radiator or condenser so as to take advantage of the pre-existing fixed mounting thereof in the engine system. There have been prior attempts to thus directly mount the oil cooler on the radiator or condenser utilizing standard flat nylon cable ties, but these attempts have in general involved almost as much difficulty and expense as the traditional bracket mounting of the coolers. Thus, available cable ties have only been sufficiently long to go through the condenser and the oil cooler, and not through all three of the radiator, condenser and oil cooler. Since the available space between the radiator and condenser is generally inadequate for insertion of a hand to manipulate the cable tie, it was usually necessary to unbolt the condenser from the radiator in order to gain access for threading the cable ties through the condenser, and thence through the oil cooler for tying the cooler to the condenser. Even then, each cable tie connection required the use of a plurality of the ties and washers. The flat construction of the cable ties permitted gross lateral bending thereof which would have precluded pushing them through both the radiator and condenser to avoid unbolting the condenser from the radiator, even if the ties had been long enough. Also, with the flat cable ties, lining up the condenser and oil cooler fins for reception of the cable ties was often difficult, and if the condenser and cooler fins were disoriented, as for example being arranged 90° apart, then a quick twist of the flat cable ties was required, which sometimes was not practical.

SUMMARY OF THE INVENTION

In view of the foregoing problems in the art, it is a general object of the present invention to provide a novel fastening system which enables an oil cooler to be quick-mounted directly on an accessible free side of a radiator or condenser without the use of conventional brackets, and without requiring that the condenser be unbolted from the radiator.

Another object of the invention is to provide a novel tension fastener for mounting one generally flat perforate structure on another such structure in generally parallel, stacked relationship, the fastener being sufficiently long to extend through the stacked perforate structures, and having substantial column strength and being generally rigid against gross lateral bending in all lateral directions so that it may simply be pushed through the plurality of perforate structures from one side of the stack.

Another object of the invention is to provide a novel fastening system for the quick mounting of one finned heat exchanger in stacked or "piggyback" relationship with one or more other finned heat exchangers, which embodies a combination of a novel elongated tension member adapted to be pushed through the stack of heat exchangers from one side thereof, resilient compression pad means engageable between the first mentioned heat exchanger and its immediately adjacent heat exchanger, and tensioning nut means engageable over a free end of the elongated tension member for applying tension force in the tension member in opposition to compression force in the compression pad means so as to provide a stable, padded mounting of the heat exchanger.

The invention utilizes a novel tension fastener for biasing a plurality of perforate structures toward each other. In the typical environment of the invention, the tension fastener is employed for mounting an oil cooler on an accessible free surface of a radiator or condenser in an engine system, with resilient pad means engaged between the oil cooler and the adjacent radiator or condenser for biasing them apart in opposition to tensioning force in the tension fastener for stability and cushioning of the mounting. The tension fastener includes an elongated, thin, generally straight tension member which is sufficiently long and thin to extend through perforations in all of the stacked structures, including the oil cooler and either a radiator or a condenser, or including the oil cooler and both a radiator and a condenser where both are present. The elongated tension member, although thin enough to pass through the spaces between adjacent cooling fins, has substantial column strength and is generally rigid against gross lateral bending in all lateral directions so as to enable it to be pushed through the stacked heat exchangers. A pair of abutment members is adapted to be secured at spaced positions along the length of the tension member on opposite free sides of the stacked structures, one of the abutment members preferably being an enlarged head proximate one end of the elongated tension member, and the other abutment member being longitudinally movable on the tension member toward the other abutment member into a tensioning position at which it is lockable onto the tension member so as to bias the oil cooler in its mounted position on the adjacent heat exchanger. Opposed knurled or resilient gripping faces are provided on the abutment members for gripping the generally fragile exposed edges of the heat exchanger fins to prevent them from slipping and bending, and thereby to prevent damage to the fins and loosening of the tension fastener.

BRIEF DESCRIPTION OF THE DRAWINGS

These and other objects of the invention will become more apparent in view of the following description wherein;

FIG. 1 is an exploded perspective view showing one form of tension fastener according to the invention;

FIG. 2 is an exploded perspective view similar to FIG. 1, showing another form of tension fastener according to the invention;

FIG. 3 is an enlarged fractional plan view taken on the line 3—3 in FIG. 1 particularly illustrating cog locking means on the elongated tension member of the fastener;

FIG. 4 is a transverse section taken on the line 4—4 of FIG. 3;

FIG. 5 is an axial section taken on the line 5—5 of FIG. 1 illustrating one form of nut member employable in the present invention;

FIG. 6 is an axial section similar to FIG. 5, but illustrating another form of nut member employable in the invention;

FIG. 7 is an elevational view of the nut member shown in FIG. 6, with the gripping element portion thereof shown in phantom;

FIG. 8 is an axial section similar to FIGS. 5 and 6, but illustrating another form of nut member employed in the present invention;

FIG. 9 is an enlarged, fragmentary elevational view taken on the line 9—9 of FIG. 5, illustrating the knurled gripping face on the nut member of FIG. 5;

FIG. 10 is a perspective view illustrating one of the compression pads employed with the invention, showing a pressure sensitive adhesive surface partially revealed;

FIG. 11 is an elevational view illustrating a typical mounting of an oil cooler on a radiator in accordance with the present invention, with two typical alternative mountings illustrated in phantom lines;

FIG. 12 is an enlarged vertical section taken on the line 12—12 of FIG. 11;

FIG. 13 is a further enlarged vertical section taken in the circle designated 13 on FIG. 12; and FIG. 14 is a diagrammatic view illustrating in solid lines a common position for mounting an oil cooler in accordance with the present invention, and illustrating in phantom lines two alternative mounting positions.

DETAILED DESCRIPTION

Referring to the drawings, and at first particularly to FIGS. 1, 3, 4, 5 and 9 thereof, the form of the invention shown in these figures includes an elongated tension member 10, an enlarged abutment member 12 integrally formed on one end of the tension member 10, and a nut member 14 forming a second abutment member which is longitudinally slidably engageable on and along the elongated tension member 10. The elongated tension member 10 is preferably at least about 10 inches long, which provides it with sufficient length to extend through a stacked array of three heat exchangers if necessary, including an engine coolant radiator, an air conditioner condenser, and an oil cooler which is to be supported on either the radiator or the condenser. The elongated tension member 10 must be quite thin along its entire length so that it can be pushed through the perforations defined between adjacent cooling fins in each of the heat exchangers. It is preferred that the elongated tension member 10 be not greater than about one-eighth inch thick in any lateral direction along its entire length, which will permit it to be pushed through the perforations defined between adjacent fins in most automotive type radiators and condensers, and in most currently available oil coolers designed for use in connection with automotive engine systems. Some radiators employ 14 fins per inch, and even though a one-eighth inch thickness of the tension member 10 is somewhat greater than the initial spacing between fins, adjacent fins can be somewhat bowed apart by insertion of the tension member 10 without adverse effect to the strength or functioning of the radiator. A typical oil cooler such as those manufactured by Hayben Trans-Cooler, Inc. of Corona, California, may have as many as 10 cooling fins per inch, but these also may be slightly bowed apart by insertion of the elongated tension member 10 without adverse effect.

Since an important advantage of the present invention over prior mounting systems is that the elongated tension member 10 be capable of being pushed from one side of the stack all of the way through a stacked array of either a radiator or a condenser and an oil cooler, or of all three of these heat exchangers, so as to simplify installation, and in particular to avoid any requirement that a condenser be unbolted from a radiator in an existing system, it is essential that despite the substantial length and the thinness of the elongated tension member 10, it be generally straight, that it have substantial column strength, and that it be generally rigid against gross lateral bending in all lateral directions. These requirements are met by making the elongated tension member of a generally rigid material, and by having the lateral dimensions of the elongated tension member 10 of the same order of magnitude in all lateral directions. A suitable generally rigid material for the elongated tension member 10 is a generally rigid plastic such as nylon, polypropylene or the like, which has good tensile strength. Because of the great length of the elongated temsion member 10, even though it is of generally rigid material, it will nevertheless have enough lateral flexibility to accommodate any misalignments which may occur between proximate perforations in the adjacent heat exchangers as it is being pushed between them. By having the lateral dimensions of the same order of magnitude in all lateral directions there will be no preferential bending tendency in any particular direction such as there would be with a generally flat strap member, and hence the elongated tension member 10 will invariably penetrate an accessible perforation in a heat exchanger when it is being pushed from one heat exchanger to the other, and there will be no tendency for the leading end of the elongated tension member 10 to curl off to the side and not enter the accessible perforation.

This general uniformity of thickness in all lateral directions will also permit the elongated tension member 10 to be readily pushed through the heat exchangers without twisting thereof regardless of disorientation between generally rectangular cross sections of successive heat exchanger perforations, whereby there is no required particular relative orientation between successive heat exchangers. This permits an oil cooler to be mounted in any favorable position of orientation relative to the heat exchanger structure upon which it is mounted. For example, as seen in FIGS. 11 and 12, the oil cooler 16 may be oriented relative to the radiator 18 upon which it is mounted so that the oil cooler fins 20 are aligned with the radiator fins 22; or alternatively, the oil cooler designated 20a in FIG. 11 may be oriented so that its fins are at right angles to the radiator fins, or the oil cooler 20b in FIG. 11 may be arranged with its fins at some other angle of orientation to those of the radiator 18.

In the form of the invention illustrated in FIGS. 1, 3, 4, 5 and 9, the locking means that is engageable between the elongated tension member 10 and the nut member 14 is in the form of cog means 24 extending along both of the lengths of the elongated tension member 10, and mating deflectable latch means 26 disposed within axial opening 28 in the nut member 14. Although any desired cog means may be provided along the length of the elongated tension member 10, the particular cog means shown on the tension member 10 comprises a series of regularly spaced ribs or cogs 30 extending along opposite sides of the elongated tension member 10 so that the tension member 10 has the general form of a double rack. The deflectable latch means 26 exposed within the axial opening 28 in nut member 14 is of frusto-conical configuration, having its root commencing proximate the forward gripping face 32 on the nut member 14, with the latch means extending rearwardly and inwardly to a free latching edge 34 disposed generally adjacent the rear surface 36 of the nut member 14.

After the elongated tension member 10 has been pushed through the stack of heat exchangers, the nut member 14 is engaged over the free end 38 of elongated tension member 10 and pushed along the tension member 10 with the deflectable latch means 26 ratcheting over the cog means 24 until the nut member 14 is seated against exposed fins of a heat exchanger, at which position the free latching edge 34 of latch means 26 will be engaged against an opposed pair of the ribs or cogs 30 of the cog means 24. This locked position of the parts is illustrated in FIGS. 12 and 13 of the drawings.

The free end 38 of elongated tension member 10 is provided with a lead-in taper as illustrated in FIG. 1 primarily to facilitate entry of the elongated tension member 10 into successive heat exchangers when the tension member 10 is pushed through them, but also to facilitate entry into the deflectable latch means 26 in the nut member 14.

As best illustrated in FIGS. 5 and 9, the forward gripping face 32 on nut member 14 is of knurled construction. The opposed forward gripping face 40 of the other abutment member 12 is similarly knurled. These opposed, knurled gripping faces on the abutment members enable the abutment members to positively grip the generally fragile exposed edges of the heat exchanger fins as illustrated in FIG. 12 so as to prevent the fins from slipping and bending, which not only prevents possible damage to the fins, but also prevents release of tension forces applied in the elongated tension member 10, and possible consequent loosening of the fastener.

FIGS. 2, 6 and 7 illustrate an alternative form of the invention, wherein the elongated tension member 10a has a generally smooth surface along its entire length, and is round in cross section, and the nut member 14a embodies a Tinnerman type spring sheet steel gripping element 26a molded into the nut member 14a and having free latching edge portions 34a exposed within the axial opening 28a of the nut member 14a. The sharp latching edge portions 34a of the Tinnerman type gripping element 26a will dig into the otherwise generally smooth surface of the elongated tension member 10a to latch the nut member 14a in its locked tensioning position on the elongated tension member 10a. The nut member 14a is engaged over and pushed along the elongated tension member 10a to this tensioning position in the same manner as the nut member 14 is pushed on and along its elongated tension member 10.

FIG. 8 illustrates a further form of nut member designated 14b which is similar in construction to the nut member 14 shown in FIG. 5 in its latching means, but which has a resilient forward gripping face 32b provided by a layer 42 of elastomeric material that is bonded to the body portion of the nut member 14b. This elastomeric layer 42 allows the edges of cooling fins to seat into the forward gripping face 32b and thereby be restrained against slipping and bending.

FIGS. 10, 11 and 12 illustrate the resilient compression pad means which forms a part of the present invention. At least three, and preferably four, resilient compression pads 44 are engaged between the oil cooler 16 and adjacent heat exchanger 18 for biasing the heat exchangers 16 and 18 apart in opposition to tensioning force in the tension members 10, so as to provide stability and cushioning in the mounting of the cooler 16 on the heat exchanger 18. The compression pads 44 are provided of sheet elastomeric material as for example closed cell foam neoprene, and may be of square and rectangular shape as shown, or may be of any other desired shape. Preferably, four of the compression pads 44 are disposed between corner portions of the cooler 16 and heat exchanger 18 against which it is mounted, as illustrated in FIGS. 11 and 12. However, the desired tensioning of the elongated tension member 10 and separation and padding of the heat exchangers may be accomplished by utilizing only three of the compression pads 44 distributed in nonaligned relationship, or alternatively any desired number of the compression pads 44 in excess of four may be utilized.

It is preferred to provide at least one of the flat surfaces of each compression pad 44 with a pressure sensitive adhesive 46 as shown in FIG. 10, which can be protected prior to use by tear-off cover means 48. This greatly facilitates assembly by permitting preliminary adhesive mounting of the compression pads 44 in the desired positions on the oil cooler 16 before the oil cooler 16 is mounted on an adjacent heat exchanger such as the radiator 18 shown in FIGS. 11 and 12.

After such preliminary adhesive mounting of the compression pads (usually four in number) on the oil cooler 16, the oil cooler 16 is loosely placed in operative position against the adjacent side of the heat exchanger such as radiator 18 upon which the oil cooler is to be mounted, and then one or more of the fasteners are operatively engaged to secure the oil cooler 16 in position. For a small oil cooler 16, generally one of the fasteners will be sufficient, and it will be applied generally at a central position on the oil cooler 16. For larger oil coolers 16, two of the fasteners will generally be sufficient, disposed in spaced-apart relationship to each other as generally illustrated in FIG. 11. In general, any number of the fasteners may be utilized as required for secure mounting of the oil cooler on an adjacent heat exchanger.

After the compression pads 44 have been preliminarily adhesively bonded to the oil cooler 16 and the cooler 16 disposed loosely against the adjacent side of the heat exchanger 18 upon which it is being mounted, the fasteners are engaged into position by simply inserting the free, lead-in ends 38 thereof into perforations defined between fins at the other side of the heat exchanger 18, and pushing the elongated tension member 10 through the heat exchanger 18 and thence through the oil cooler 16, utilizing the enlargement of the fixed abutment member 12 as a handle for the pushing movement. When each elongated tension member 10 has been pushed all of the way through the plurality (two or more) of heat exchangers, such as the heat exchangers 18 and 16, then the nut member 14 is engaged over the free end 38 of the elongated tension member 10, and pushed along the tension member 10 until it engages against the exposed side of the oil cooler 16. Tension can be applied by simply pulling outwardly on the free end portion of the elongated tension member 10, so as to seat the fixed abutment member 12 against the back side of heat exchanger 18, while at the same time pushing forwardly on the movable nut member 14 and hence also upon the oil cooler 16, until the compression pads 44 are compressed as illustrated in FIG. 12. Then, with the latching means engaged between the nut member 14 and the elongated tension member 10, when the parts are released, the pads 44 will be in compression, and the elongated tension members 10 will be in tension. The mounting of the oil cooler 16 is thus very stable, and able to withstand a considerable amount of vibration and shock as generally occurs in automotive applications, without the mounting becoming loosened or fin edges of the heat exchangers becoming damaged.

The installation may be completed by cutting off unused lengths of the free end portions of tension members 10 adjacent to the nut members 14 as illustrated in FIGS. 12 and 13.

FIG. 14 illustrates several alternative mounting positions for an oil cooler in an automotive engine environment. Conventionally, in an automotive engine system having an engine 50, there will be disposed forward of the engine in succession an engine coolant radiator 52, and an air conditioner condenser 54 that is disposed in spaced relationship forwardly of and generally parallel to the radiator 52. A preferred mounting position for an oil cooler 56 is shown in solid lines in FIG. 14, wherein the oil cooler 56 is mounted according to the present invention on the exposed forward side of the condenser 54. In this position, the fasteners of the present invention will be engaged from the rear of the radiator 52 and pushed successively through perforations in the radiator 52, the condenser 54 and oil cooler 56, with the fixed abutment members 12 disposed behind the radiator 52, and the nut members 14 disposed in front of the oil cooler 56. Alternatively, the fasteners may be pushed from front to rear, with the fixed abutment member 12 in front of the oil cooler 56, and the nut member 14 applied to the rear of radiator 52.

An alternative position 56a of the oil cooler is shown in phantom behind the raditor 52, in which case the fasteners of the invention may also be engaged either from the front or from the rear as described in connection with the solid line oil cooler 56. A still further alternative position 56b of the oil cooler is shown in phantom immediately in front of the radiator 52, in which position it is preferred to unbolt the condenser 54 from its mounting relative to radiator 52 to facilitate engagement of the fasteners of the present invention through only the oil cooler 56b and radiator 52, and not through the condenser 54. Another alternative position that is not illustrated would be to mount the oil cooler against the rear side of condenser 54, which also would be most easily accomplished by unbolting the condenser 54 from its mounting relative to radiator 52, and then engaging the fasteners of the invention only through the oil cooler and the condenser 54.

Although two specific types of locking means have been disclosed between the movable abutment member and the elongated tension members, it is to be understood that other forms of locking means may be employed within the scope of the invention, which enable the nut member to be moved longitudinally over and along the elongated tension member and cinched up into its locking or tensioning position. For example, if desired the cog means on the elongated tension member may comprise external threads on the elongated tension member 10, with the nut member 14 being provided with mating internal threads.

While the invention has been particularly shown and described with reference to a preferred embodiment thereof, it will be understood by those skilled in the art that various changes in form and details may be made therein without departing from the spirit and scope of the invention.

I claim:

1. In a power system having an engine, heat exchanger structure comprising at least one generally flat heat exchanger mounted in fixed relationship to said engine for cooling liquid associated with said engine, and a generally flat oil cooler structure for cooling oil associated with said engine, said structures being of the type having fins and perforations arranged generally normal to the general planes thereof,
    a fastening system for mounting said oil cooler structure in stacked relationship on one side of said heat exchanger structure, which comprises
    an elongated, thin, generally straight tension member which is sufficiently long and thin to extend through perforations in said structures and to project beyond the free sides of the structures in stacked relationship,
    said tension member having substantial column strength and being generally rigid against gross lateral bending in all lateral directions so as to enable it to be pushed through said structures in stacked relationship,
    a pair of abutment members adapted to be secured at spaced positions along the length of said tension member on opposite free sides of said structure in stacked relationship,
    at least one of said abutment members being longitudinally movable on said tension member toward the other abutment member into a tensioning position of the fastening system wherein said tension member is placed under tension between said abutment members,
    and locking means engageable between said movable abutment member and said tension member for locking them in said tensioning position.

2. A fastening system as defined in claim 1, which includes resilient compression pad means engaged between said structures so as to bias said structures apart in opposition to tensioning force in said tension member.

3. A fastening system as defined in claim 2, wherein said compression pad means comprises at least three non-aligned compression pads.

4. A fastening system as defined in claim 3, wherein said oil cooler structure is generally rectangular, and said compression pad means comprises four compression pads disposed proximate the respective corners of said oil cooler structure.

5. A fastening system as defined in claim 2, wherein said compression pad means comprises foam elastomeric material.

6. A fastening system as defined in claim 1, which includes a plurality of said tension members and their respective pairs of abutment members, said tension members being disposed in generally parallel, spaced relationship.

7. A fastening system as defined in claim 1, wherein the lateral dimensions of said tension member are of the same order of magnitude in all lateral directions so as to enable the tension member to be pushed through said structures without twisting thereof regardless of disorientation between perforations of the respective structures.

8. A fastening system as defined in claim 1, wherein said tension member comprises plastic.

9. A fastening system as defined in claim 1, wherein one of said abutment members comprises a head integrally formed on said tension member proximate one end thereof, and the other abutment member comprises a nut member engageable on said tension member from the other end thereof.

10. A fastening system as defined in claim 9, wherein said other end of said tension member comprises a lead-in taper to facilitate insertion through said structures.

11. A fastening system as defined in claim 9, wherein said locking means comprises cog means on said tension member extending along a substantial portion of its length, and gripping means in said nut member engageable with said cog means.

12. A fastening system as defined in claim 11, wherein said gripping means comprises deflectable latch means in said nut member.

13. A fastening system as defined in claim 12, wherein said latch means is generally frusto-conical in configuration.

14. A fastening system as defined in claim 11, wherein said cog means and gripping means comprise threads.

15. A fastening system as defined in claim 11, wherein said locking means comprises a Tinnerman type gripping element in said nut member.

16. A fastening system as defined in claim 1, wherein at least one of said abutment members includes a generally transversely arranged gripping face directed toward the other abutment member and adapted to engage against one of said structures.

17. A fastening system as defined in claim 16, wherein each of said abutment members includes one of said gripping faces.

18. A fastening system as defined in claim 16, wherein said gripping face comprises generally knurled surface means.

19. A fastening system as defined in claim 16, wherein said gripping face comprises a layer of elastomeric material.

* * * * *